Figure 3:
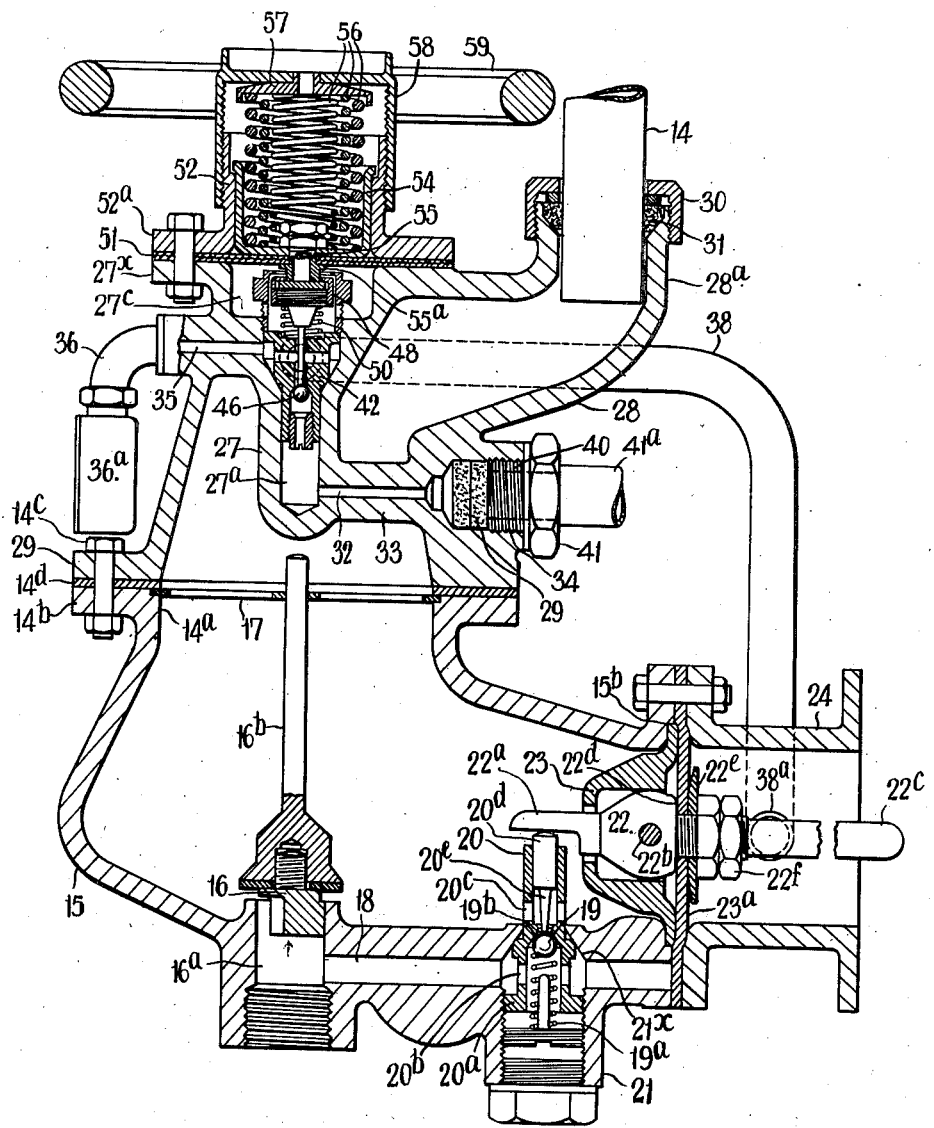

March 2, 1937.                    L. E. COWEY                    2,072,296
                        MACHINE FOR CARBONATING LIQUIDS
                        Filed April 12, 1935         3 Sheets-Sheet 1
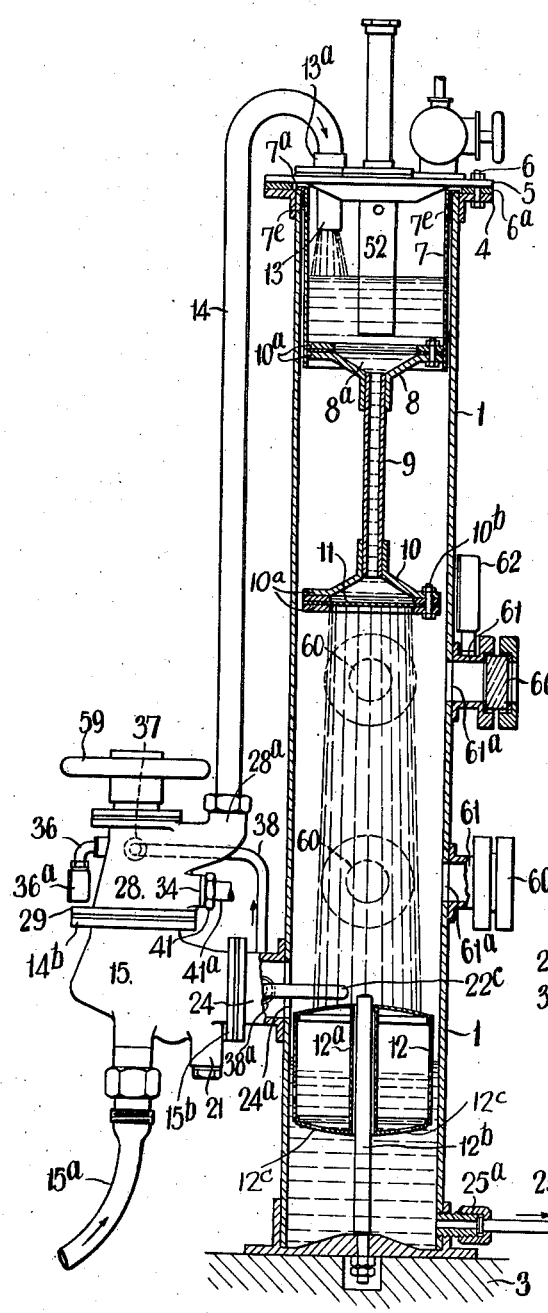
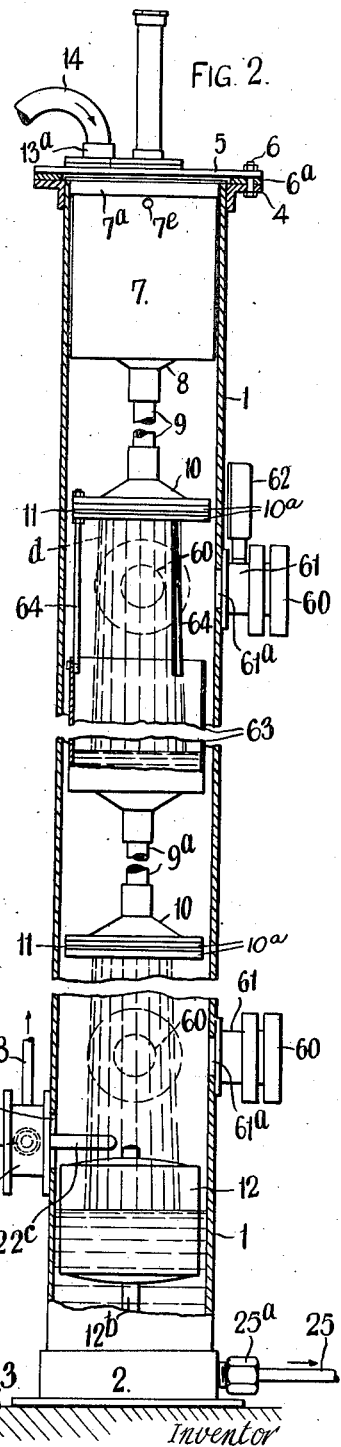
Inventor
L. E. COWEY
per V. R. Bowden
Attorney March 2, 1937.  L. E. COWEY  2,072,296
MACHINE FOR CARBONATING LIQUIDS
Filed April 12, 1935   3 Sheets-Sheet 2

Inventor
L. E. COWEY
per R. Bowden
Attorney.

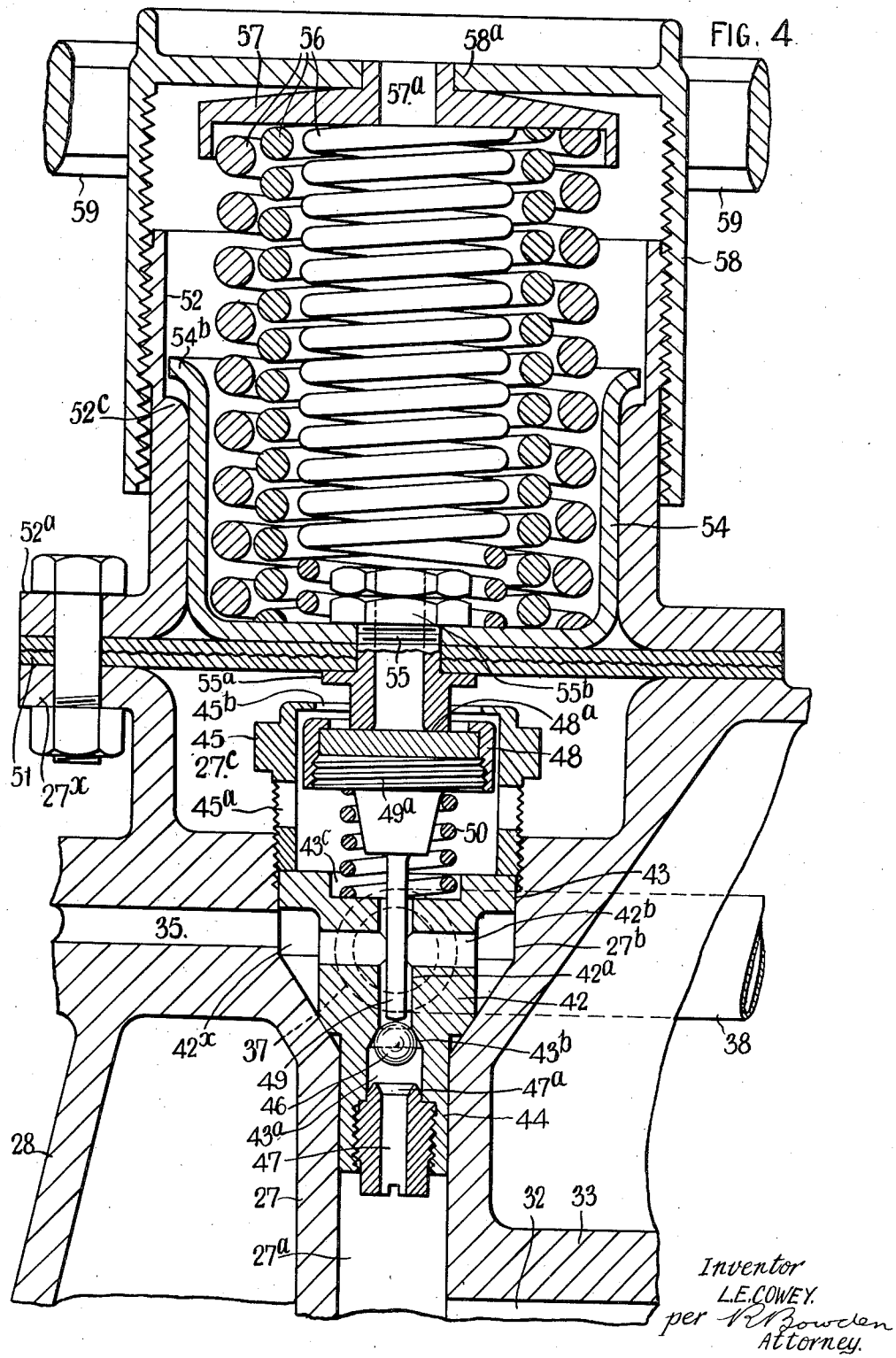

Patented Mar. 2, 1937

2,072,296

UNITED STATES PATENT OFFICE 2,072,296

MACHINE FOR CARBONATING LIQUIDS

Leonard Eugene Cowey, Richmond, England

Application April 12, 1935, Serial No. 16,020
In Great Britain April 10, 1934

5 Claims. (Cl. 261—19)

This invention relates to apparatus for aerating water and other liquids of the kind in which the liquid is sprayed within a closed vessel supplied with aerating gas at suitable pressure, so that it becomes aerated as it falls to and collects under pressure in the lower part of the vessel from which it is drawn off.

In such apparatus the water supply is automatically controlled by a float arranged within the aerating vessel, while the supply of aerating gas to, and the venting of air displaced from the liquid during aeration thereof, and of excess gas, is controlled by automatic valves arranged in connection with the aerating vessel.

Objects of the present invention are to provide new and improved means for spraying the liquid within the vessel at a head or pressure that is independent of the pressure of the liquid supply service, to improve the float-actuated mechanism for automatically controlling the supply of liquid to the aerating vessel, and generally to improve the details of construction and arrangement of aerating apparatus of the kind referred to so as to increase the efficiency and reliability thereof.

According to this invention a cistern is arranged in the upper part of the aerating vessel to receive the water or other liquid to be aerated and is discharged from such cisterns in one or a series of fine showers, at a predetermined head or pressure which is independent of that of the supply service of the cistern, which showers fall through the aerating gas admitted to the vessel at a suitable pressure through a reducing valve, thus rapidly aerating the liquid as it falls and collects under pressure in the lower part of the aerating vessel.

For this purpose the cistern is provided with an outlet pipe that leads to a finely divided screen so that the liquid from the cistern is delivered at a head or pressure determined by the length of the outlet pipe to the screen, through which it passes as a fine shower or spray which may fall to the lower part of the vessel, or into an interposed tank furnished with an outlet pipe that leads to a second screen.

The supply of water or other liquid to the cistern is automatically controlled through a float arranged in the lower part of the vessel so that as the aerated liquid rises to a predetermined level the float operates a lever connected with a valve that short-circuits the water supply, and so cuts off or reduces the delivery to the cistern.

The aerating gas is supplied from a suitable reservoir to the aerating vessel through an automatic reducing valve arranged in combination with an escape valve so that when the internal pressure in the aerating vessel exceeds a predetermined limit, air displaced from the aerated liquid together with excess gas is vented through the escape valve and as the pressure falls aerating gas is admitted at the requisite pressure through the reducing valve.

The invention is further described with the aid of the accompanying drawings, wherein similar references indicate like parts.

Fig. 1 is a vertical sectional view illustrating one construction of aerating apparatus in accordance with the present invention; Fig. 2 is a fragmental vertical sectional view with parts omitted showing a further construction in which two showers or cascades are arranged in series within the aerating vessel; Fig. 3 a detail sectional view on an enlarged scale illustrating the means for automatically short-circuiting the water supply, and also the automatic reducing and escape valve mechanism for controlling the supply of aerating gas to, and the venting of air and excess gas from the aerating vessel, and Fig. 4 is a detail sectional view on a still larger scale further illustrating the construction of the reducing and escape valve mechanism in accordance with the present invention.

As shown in the drawings, the aerating vessel comprises a cylinder 1 of copper or other suitable metal which is mounted vertically in a metal socket 2 firmly secured to a suitable foundation 3, while the upper end of the tube is furnished with an external flange 4 and a detachable cover 5 that is adapted to be secured gas tight to the flange by means of bolts and nuts 6 and an annular washer 6a interposed between the flange and cover.

7 indicates the cistern mounted in the top of the cylinder 1 to receive the liquid to be aerated. Such cistern is cylindrical and is of less diameter than the interior of the cylinder 1, in which latter it is suspended by means of an external flange 7a so that it is surrounded by an annular space as indicated.

The bottom 8 of the cistern is dished or coned and furnished with a central opening 8a that is connected to an outlet pipe 9, the lower end of which is secured in a centrally perforated conical cover 10 which carries a finely divided screen 11. Such screen may consist of a finely perforated silver or other suitable metal plate with a protecting shield of muslin or other suitable fabric, and is clamped to the cover 10 by annular washers 10a and bolts and nuts 10b. The perforated screen is thus suspended from the cistern by the outlet pipe 9 and is dimensioned so as to leave an annular clearance between its periphery and the inner wall of the cylinder 1, in the bottom of which a float 12 is mounted. As shown, the float is made of sheet metal and furnished with a central tubular guide 12a by means of which it is loosely mounted upon a vertical rod 12b, the lower end of which is conveniently secured in the bottom of the socket 2.

The float is dimensioned so as to leave an annular clearance between its periphery and the cylinder 1, while the lower part thereof is perforated at 12c to prevent the same being subjected to excessive external pressure.

The cover 5 is furnished with a water inlet nozzle 13 that is connected by a suitable union 13a to one end of a liquid supply pipe 14, the other end of which is connected to the case 15 of a non-return valve 16 (see Fig. 3), such valve case being also connected by a pipe 15a to a pump or other suitable source of liquid supply, not shown.

The valve case 15 is furnished with a flanged opening 15b (Fig. 3) by which it is bolted or otherwise connected to an externally flanged tubular fitting 24 secured to the exterior of the cylinder 1 in register with an opening 24a formed in the lower part thereof (see Figs. 1 and 2).

The valve 16 is mounted in the inlet port 16a and is furnished with a vertical spindle 16b that works through and is guided by a centrally perforated spider 17 mounted in the outlet opening 14a of the valve case and pulsates with the liquid delivered by the pump through the inlet port.

The inlet 16a of the valve case is connected through a by-pass passage 18 with a by-pass valve 19 arranged in the valve case 15 so as to be controlled through an operating lever 22 by the float 12 in the lower part of the cylinder 1.

The valve 19 is controlled by a spring 19a mounted in a tubular housing 20 comprised in a tubular plug 20a that is secured in a tubular boss 21 of the valve casing 15 so as to communicate with the by-pass passage 18 therein; the tubular boss 21 is internally threaded to engage the externally threaded tubular plug 20a having a reduced extension which forms the housing 20 of the by-pass valve, and projects into the valve casing 15 through the opening 21x formed in alignment with the boss 21.

Lateral openings 20b and 20c are formed in the tubular plug 20a so as to connect the interior of the valve casing 15 with the by-pass passage 18 via the spring controlled valve 19 that is normally closed on a seating 19b formed in the plug 20a, between the lateral openings 20b and 20c therein.

A plunger 20d furnished with a tail piece 20e is slidably mounted in the inner end of the housing 20, so that the tail piece abuts the valve 19, while the outer end of the plunger 20d engages one arm 22a of the operating lever 22.

The operating lever 22 is pivoted at 22b in a flanged tubular support 23 and passes through a centrally perforated rubber or other flexible diaphragm 23a in which it is clamped gas tight between a shoulder 22d on the lever 22 and a plate 22e on the lever arm 22c by means of nuts 22f.

The flanged tubular support 23 together with the diaphragm 23a are clamped gas tight between the flanged opening 15b of the valve casing and the adjacent flange of the tubular fitting 24 on the cylinder 1 so that one arm 22c of such operating lever projects through the tubular fitting 24 and opening 24a into the lower part of the cylinder 1 in the path of the float 12 mounted in the latter.

The water or other liquid to be aerated is delivered through the valve 16 and supply pipe 14 to the cistern 7 from which it flows through the outlet pipe 9 so that it is delivered to the screen 11 at a sufficient head or pressure determined by the length of the outlet pipe 9 to pass through the screen as a finely divided shower or spray that rapidly takes up the aerating gas admitted at suitable pressure to the interior of the cylinder 1, as presently described.

The aerated liquid collects in the bottom of the cylinder, from which it is withdrawn for use to a filling machine or otherwise as required through an outlet pipe 25 connected by a coupling 25a to the bottom of the cylinder 1.

As the aerated liquid collects in the bottom of the cylinder it causes the float 12 to rise until the aerated liquid reaches a pre-determined level, when the float comes into contact with the arm 22c of the operating lever 22 and depresses the lever arm 22a which forces down the plunger 20d of the by-pass valve 19, thus opening the latter so that the water is returned from the valve casing 15 via the by-pass passage 18 to the inlet 16a, instead of being delivered through the pipe 14 to the cistern 7, and when the float falls and releases the operating lever 22 the by-pass valve 19 is closed by its spring 19a so that the delivery of liquid to the cistern 7 is resumed via the pipe 14. In explanation of the above it should be said that valve casing 15 is connected through its inlet 16a with a reciprocating pump which delivers an unvarying volume of water at every alternate stroke. When the by-pass valve 19 is opened by the rise of the float 12 in the bottom of the aerating vessel 1, the water enters the casing 15 through the open by-pass valve 19 as well as through the main inlet valve 16, but on the return or suction stroke of the pump the inlet valve 16 closes while the by-pass valve 19 remains open, so that water flows rapidly through the open valve from the casing 15 under the head or pressure of the pipe 14, and owing to this pressure more water is discharged through the open by-pass valve during the return or suction stroke of the pump than is delivered by the pump through the inlet valve 16 and the open by-pass valve, so that no water is delivered to the cistern 7 in the upper end of the aerating chamber 1.

The aerating gas is admitted from a gas bottle or other suitable reservoir through an adjustable reducing valve so that the pressure of aerating gas within the cylinder 1 can be regulated as required and automatically maintained.

The reducing valve together with an escape valve and a high pressure gas inlet valve are housed in a casing 27, arranged in connection with the casing 15 of the water supply valve, so as to form a jacket about the gas valve casing 27, through which circulates the water or other liquid to be aerated on its passage to the cistern 7 in the aerating vessel.

As shown at Fig. 3, the gas valve casing 27 is formed integrally with the cover 28 of the water valve casing 15, so that the cover forms a water jacket about the gas valve casing 27. The cover 28 is externally flanged at its open end 29 and is bolted or otherwise detachably secured watertight to the counterpart flange 14b about the outlet opening of the casing 15 by bolts and nuts 14c and a packing washer 14d, while the top of the cover comprises an outlet nozzle 28a in which is secured the lower end of the water supply pipe 14, by a union 30 and internal packing 31. The gas valve casing 27 is thus jacketed by the water or other liquid circulated through the water valve casing 15, which prevents freezing of the gas valve mechanism, while also cooling the water or other liquid.

The casing 27 comprises a tubular bore 27a, of which the upper part 27b is enlarged, and terminates in a recess 27c formed in the top of the casing. The enlargement of the bore 27b is connected by a cross passage 35 in the top of the casing to a fitting 36 that carries a pressure gauge 36a and is similarly connected to an outlet nozzle 37, indicated by dotted lines in Figs. 1 and 3, that is connected with the aerating vessel by a pipe 38 and inlet port 38a in the fitting 24 to which the casing 15 is connected.

The inlet nozzle 34 is adapted to house gas filters 39 secured therein by a screw plug 40, provided with a union 41 for connection to the supply pipe 41a of a gas bottle or other source of high pressure aerating gas such as carbonic anhydride.

A tubular plug 42 comprising an enlarged head 43 and a reduced lower end 44 is secured to the casing 27 by a cap nut 45. The head 43 of the plug fits gas tight into the enlargement 27b of the bore of the casing 27, while the reduced lower end 44 of such plug fits gas tight in the bore 27a so that an annular gas tight space 42x is formed about the plug 42 below the enlarged head thereof, which space is connected with the outlet nozzle 37 and pipe 38, and also with the pressure gauge 36a via the passage 35, and is also connected by cross passages 42b with the bore 42a of the plug.

The bore 42a of the plug terminates at its lower end in an enlargement 43a, in which is housed the ball valve 46 that is retained in such housing by an externally threaded tubular nipple 47 screwed into the lower end of the enlargement 43a. The inner end of the tubular nipple is formed with a coned seating 47a for the ball valve 46, while a second seating 43b for such valve is formed at the junction of the enlargement 43a, with the lower end of the bore 42a of the plug.

The ball valve 46 forms a high pressure gas inlet valve, and is connected via the nipple 47, bore 32 of the bridge piece 33, inlet nozzle 34 and union 41, with the high pressure gas supply pipe 41a.

The reducing valve comprises a piston 48 furnished with a tail rod 49 and controlled by a spring 50, which piston is slidably assembled in the cap nut 45 so that the tail rod 49 passes freely through the bore 42a of the plug 42 secured in the valve casing 27 by the cap nut 45.

The piston 48 is tubular and internally threaded for engagement with an externally threaded plug 49a, which carries the tail rod 49 and also serves to clamp an internal fibre, rubber or other suitable packing disc 48a against the perforated end of the piston.

The spring 50 is carried in a recess 43c of the plug head 43, and normally urges the piston 48 upwards in the cap 45, so that the lower end of the tail rod 49 lightly bears upon the high pressure gas inlet valve 46 when the latter is seated in the lower end of the plug bore 42a.

The cap nut 45 is laterally perforated, as indicated at 45a, and projects into the recess 27c in the top of the valve casing so that such recess is connected by the perforations 45a with the interior of the cap nut, in the upper end of which is formed an opening 45b. The recess 27c is closed by a spring loaded diaphragm 51, through which the reducing valve and also the gas escape valve are controlled.

The diaphragm 51 is clamped between the external flange 52a of a tubular fitting 52 and a counterpart flange 27x of the valve casing 27 by means of bolts and nuts which pass through perforations in such flanges and diaphragms.

The diaphragm 51 is centrally perforated and secured gas tight to the centrally perforated end of a cup-like plunger 54 by an externally threaded bolt 55 having a flanged head 55a. The threaded stem of the bolt is passed through the perforated diaphragm and the perforated end of the plunger 54, in which it is secured by nuts 55b, so that the flanged head bears against and projects from the opposite face of the diaphragm.

The plunger 54 is slidably mounted in the tubular fitting 52 and carries a nest of concentrically disposed springs 56, the upper ends of which springs engage with a flanged disc 57 furnished with a central perforated boss 57a by which such disc is mounted in a central aperture in the end 58a of an internally threaded cap nut 58 that is adapted to engage a counterpart external thread on the tubular fitting 52, and is provided with a hand wheel 59 so that the pressure of the springs 56 on the plunger 54 and flexible diaphragm 51 can be varied by appropriate adjustments of the cap nut 58.

The outward movement of the plunger 54 and consequent flexing of the diaphragm 51 under the influence of the springs is limited by the engagement of an external flange 54b on the open end of the plunger 54 with a counterpart internal collar 52c in the tubular fitting 52.

When the tubular fitting 50 and the diaphragm 51 are assembled to the valve casing 27, the head 55a of the tubular bolt 55 extends through the opening 45b in the upper end of the cap nut 45 and normally seats gas tight against the packing disc 48a in the perforated end of the reducing valve piston 48.

The recess 27c and annular space 42x of the valve casing 27 are interconnected with each other through the bore 42a and cross passages 42b of the plug, and with the aerating vessel 1 via the pipe 38, so that the gas pressure in the recess 27c fluctuates with that in the aerating vessel 1. As the gas pressure in the aerating vessel falls, the pressure of the loading springs 56 of the tubular fitting 52 flexes the diaphragm 51 and thus depresses the reducing valve piston 48 against the resistance of its supporting spring 50 so that the tail rod 49 unseats the inlet valve 46 so that high pressure aerating gas is admitted past such valve to the aerating vessel via the bore 42a and passages 42b of the plug, the annular space 42x, outlet nozzle 37, pipe 38 and fitting 24, and as the pressure rises in the aerating vessel, such pressure together with that of the spring 50 of the reducing valve piston returns the diaphragm 51 simultaneously with the return of the piston 48 and tail rod 49 so that the inlet valve 46 is again closed on its seating 43b by the high pressure aerating gas which enters the closed end of the casing 27 via the inlet nozzle 34, while the gas pressure in the casing 27 is registered by the pressure gauge 36a connected therewith.

When the pressure of gas entering through the inlet nozzle 34 falls, as for example, when changing the connection of the inlet pipe 41a from one gas bottle to another, the inlet valve 46 falls on to the seating 47a of the nipple 47 and thus prevents escape of gas from the aerating vessel via the valve housing 27 and the inlet nozzle 34 thereof.

When the pressure in the aerating vessel rises, the corresponding increase of pressure in the recess 27c of the valve casing 27 lifts the flexible diaphragm 51 against the resistance of its loading springs 56, so opening the escape valve constituted by the head 55a of the tubular bolt 55, so that excess gas and air escape via the tubular bolt 55 as the head 55a of the latter is raised out of contact with the disc 48a of the reducing valve piston 48.

As the internal pressure again falls, the diaphragm 51 is returned to its normal position by its loading springs, thus re-engaging the head 55a of the tubular bolt with the reducing valve piston.

With the improved construction and arrangement of the reducing and gas outlet valves, respectively comprising the piston 48 and the tubular bolt 55, both valves are simultaneously adjusted and controlled by the same springs instead of the escape valve having a separately adjustable control. The valve 48 is a safety valve which prevents excessive pressure developing in the carbonator, which in turn is connected to filling machines or the like. Increased pressure in the carbonator may be caused by leakage of high pressure gas past the inlet valve 46, while the withdrawal of aerated water from the carbonator is interrupted.

The internal pressure of the carbonator may be increased by air forced out of solution during process of carbonating the water. The internal pressure may also be increased by back pressure from the filling machine, storage tanks or the like with which the carbonator is connected.

When the apparatus is running normally, the valve 48a is seldom operated, but when interruptions occur, especially in the withdrawal of aerated liquid from the vessel 1, the valve effectively prevents rise in the internal pressure of such vessel.

The aerating cylinder 1 is furnished with inspection windows 60 which are mounted in tubular fittings 61 in register with apertures 61a in the cylinder, so that light from a lamp can be directed through one window, and the interior of the cylinder can be easily inspected through the other, while a pressure gauge 62 is conveniently mounted upon one of the fittings 45 so as to register the pressure within the cylinder 1.

The construction illustrated at Fig. 2 is similar to that last described, except that the aerating cylinder 1 is furnished with two finely divided screens 11 arranged in series so that the liquid to be aerated is caused to fall in two showers or sprays instead of one, as previously described.

For this purpose, the cylinder 1 is made of sufficient length to accommodate the two showers or sprays. The first shower or spray d from the first screen 11 falls into a tank 63 interposed between the upper and lower screens.

The tank 63 is of similar construction to the cistern 7 and is furnished with an outlet pipe 9a that is connected to the cover 10a of the lower screen, and is of such length as to deliver the liquid to such screen at a head or pressure sufficient to pass through the second screen as a finely divided shower or spray which collects in the bottom of the cylinder 1 as previously described.

As indicated in the drawings, the interposed tank 63 is suspended by rods 64 from the first screen 11, from which tank the second screen is suspended by the outlet pipe 9a while the interposed tank together with the upper and lower screens are adapted to form annular clearances between their peripheries and the interior of the cylinder 1, so as to allow the aerating gas to rise and circulate freely past the same. In this application I make no claims as to the construction of the gas pressure regulating valve mechanism per se as that constitutes the subject matter of a divisional application filed October 19, 1935, Serial No. 45,825.

I claim:

1. In apparatus of the kind referred to for aerating water and other liquids comprising a closed aerating vessel to which aerating gas is admitted under pressure, a pulsating non-return inlet valve through which the liquid is passed to the vessel, a cistern arranged therein and connected with the supply of liquid to be aerated, an outlet pipe in series with a finely divided screen through which the liquid passes from the cistern and is sprayed at a head or pressure determined by the length of said outlet pipe, and falls and collects under pressure in the lower part of the aerating vessel, a float in said aerating vessel, a spring-controlled by-pass valve, a pivoted lever mounted in a gas tight support so that one arm thereof extends into the aerating vessel in the path of the float, while the other arm is operably connected to said spring controlled by-pass valve through which the liquid passing to the vessel through said pulsating non-return inlet valve is returned to the inlet of said non-return valve when the lever is operated by said float.

2. Apparatus of the kind referred to for aerating water and other liquids comprising a closed aerating vessel supplied with aerating gas under pressure, a cistern arranged therein, an outlet pipe with a screen through which liquid from the cistern is sprayed at a head or pressure determined by the length of such outlet pipe, a pipe arranged in series with a non-return inlet valve including a casing and connected with a pulsating source of liquid supply through which pipe and valve said cistern is supplied with liquid, a spring controlled by-pass valve mounted in said casing, a lever mounted in a gas tight support so that the one arm of said lever being operatively connected to said by-pass valve and the other arm of said lever projects through an opening in the aerating vessel, a float in said aerating vessel into the path of which said other arm projects, so that when the aerated liquid collected in the said vessel reaches a pre-determined level, said float operates said lever and by-pass valve past which the liquid entering the valve casing is returned to the inlet of the said valve casing.

3. In apparatus of the kind referred to for aerating water and other liquids, the combination with a closed aerating vessel of a cistern and a screen arranged within said vessel, a pipe connection from said cistern to said screen through which liquid is delivered to and sprayed through said screen at a head or pressure determined by the length of said pipe, a supply pipe discharging into said cistern and connected with a source of liquid to be aerated through a valve casing in said connection, a non-return inlet valve in said valve casing for the liquid, a spring controlled by-pass valve in said valve casing, a float arranged in the aerating vessel, a pivoted lever mounted gas tight in a support, a casing which forms a housing and containing an adjustable automatic reducing valve, a high pressure gas inlet valve, and a gas escape valve operably interconnected with each other, said housing being connected to a source of high pressure aerating gas supply through said gas inlet valve, and also connected to the aerating vessel through said reducing valve, so that fluctuations in the internal pressure of said aerating vessel cause operation of the reducing valve together with the gas inlet valve controlled thereby when the pressure falls, for the admission of gas to the aerating vessel via the reducing valve, while said gas escape valve is automatically opened if the internal pressure rises to vent excess fluids from the closed aerating vessel.

4. Apparatus for aerating water and other liquids according to claim 3 wherein the casing that houses the automatic reducing valve together with the high pressure gas inlet valve and gas escape valve is arranged in the valve casing, through which liquid is circulated to the cistern in the closed aerating vessel so that the gas valve casing is jacketed by said liquid.

5. In apparatus of the kind referred to for aerating liquids, a closed tower-like aerating vessel, means for admitting aerating gas under pressure into said vessel, a cistern located in the upper portion of said vessel, means to admit water into said cistern, said cistern having a cone bottom with an opening at its apex, a relatively long pipe connected to said bottom at said opening, a flared member on the lower end of said pipe, a screen over the flared end of said member, all being arranged so that the water from the cistern is forced through said screen by the head or pressure developed in said pipe.

LEONARD EUGENE COWEY.